US010895325B2

(12) United States Patent
Nowell et al.

(10) Patent No.: US 10,895,325 B2
(45) Date of Patent: Jan. 19, 2021

(54) SEALING HIGH PRESSURE FLOW DEVICES

(71) Applicant: Kerr Machine Co., Sulphur, OK (US)

(72) Inventors: Mark S. Nowell, Ardmore, OK (US);
Kelcy Jake Foster, Ardmore, OK (US);
Michael Eugene May, Ardmore, OK (US);
Brandon Scott Ayres, Ardmore, OK (US);
Christopher Todd Barnett, Stratford, OK (US);
Michael Cole Thomas, Ardmore, OK (US);
Guy J. Lapointe, Sulphur, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 15/719,124

(22) Filed: Sep. 28, 2017

(65) Prior Publication Data

US 2018/0017173 A1 Jan. 18, 2018

Related U.S. Application Data

(63) Continuation-in-part of application No. 15/280,642, filed on Sep. 29, 2016, now Pat. No. 10,288,178.
(Continued)

(51) Int. Cl.
*F16K 5/18* (2006.01)
*F15B 7/06* (2006.01)
(Continued)

(52) U.S. Cl.
CPC ............ *F16K 5/184* (2013.01); *F04B 53/164* (2013.01); *F04B 53/22* (2013.01); *F15B 7/06* (2013.01); *F15B 21/00* (2013.01); *F16J 15/062* (2013.01); *F16K 5/0271* (2013.01); *F16K 5/0464* (2013.01); *F16K 5/0471* (2013.01); *F16K 5/0485* (2013.01); *F16K 5/0492* (2013.01); *F16K 5/161* (2013.01); *F16K 5/181* (2013.01)

(58) Field of Classification Search
CPC ...... F16K 5/184; F16K 5/0471; F16K 5/0485;
F16K 5/161; F16K 5/0464; F16K 5/181;
F16K 5/0271; F16K 5/0492; F15B 7/06;
F15B 21/00; F16J 15/062; F04B 53/22;
F04B 53/164; F04B 53/162; F04B 53/16
USPC .......... 251/363, 366–367, 359, 360; 417/454
See application file for complete search history.

(56) References Cited

U.S. PATENT DOCUMENTS 1,316,539 A * 9/1919 Ford .................... F16K 1/42
251/363
1,822,682 A 9/1931 Weiger
(Continued)

OTHER PUBLICATIONS

Fluid end assemblies like those disclosed in Figure 11 of the current application and Figure 11 of the parent application, U.S. Patent Publication No. 2017/0089473, were offered for sale in the United States more than 1 year prior to Sep. 28, 2017.
(Continued)

*Primary Examiner* — John Bastianelli
(74) *Attorney, Agent, or Firm* — Tomlinson McKinstry, P.C.

(57) ABSTRACT

Apparatus and method contemplating a high pressure fluid end assembly having a body defining a body bore and defining a recess in the body intersecting the body bore. A closure is joined to the body and forms a sealing surface. A seal is mounted to the body in the recess and configured to extend from the recess beyond the body bore to seal against the sealing surface formed by the closure.

25 Claims, 16 Drawing Sheets

Related U.S. Application Data

(60) Provisional application No. 62/346,915, filed on Jun. 7, 2016, provisional application No. 62/318,542, filed on Apr. 5, 2016, provisional application No. 62/315,343, filed on Mar. 30, 2016, provisional application No. 62/234,483, filed on Sep. 29, 2015.

(51) Int. Cl.
*F16K 5/04* (2006.01)
*F16J 15/06* (2006.01)
*F15B 21/00* (2006.01)
*F16K 5/16* (2006.01)
*F16K 5/02* (2006.01)
*F04B 53/22* (2006.01)
*F04B 53/16* (2006.01)

(56) References Cited

U.S. PATENT DOCUMENTS

| | | | | |
|---|---|---|---|---|
| 2,713,522 | A | 7/1955 | Petch | |
| 2,756,960 | A | 7/1956 | Church | |
| 2,856,857 | A | 10/1958 | Saalfrank | |
| 3,053,500 | A | 9/1962 | Atkinson | |
| 3,146,724 | A | 9/1964 | Cornelsen | |
| 3,152,787 | A | 10/1964 | Timmons | |
| 3,173,648 | A * | 3/1965 | McGuire | F16K 5/0673 251/188 |
| 3,179,121 | A | 4/1965 | Bredtschneider et al. | |
| 3,257,952 | A | 6/1966 | McCormick | |
| 3,373,695 | A * | 3/1968 | Yohpe | F04B 53/1025 417/569 |
| 3,427,988 | A * | 2/1969 | Schmieman | F04B 53/10 417/569 |
| 3,474,808 | A | 10/1969 | Elliott | |
| 3,589,387 | A | 6/1971 | Raymond | |
| 3,679,332 | A | 7/1972 | Yohpe | |
| 4,047,850 | A | 9/1977 | Berthelot | |
| 4,170,214 | A | 10/1979 | Gill et al. | |
| 4,363,463 | A | 12/1982 | Moon, Jr. | |
| 4,388,050 | A | 6/1983 | Schuller | |
| 4,467,703 | A | 8/1984 | Redwine et al. | |
| 4,470,771 | A | 9/1984 | Hall et al. | |
| 4,520,837 | A * | 6/1985 | Cole | E21B 33/13 137/68.23 |
| 4,768,933 | A | 9/1988 | Stachowiak | |
| 4,771,801 | A | 9/1988 | Crump et al. | |
| 4,773,833 | A | 9/1988 | Wilkinson et al. | |
| 4,778,347 | A | 10/1988 | Mize | |
| 4,861,241 | A | 8/1989 | Gamboa et al. | |
| 4,878,815 | A | 11/1989 | Stachowiak | |
| 4,948,349 | A | 8/1990 | Koiwa | |
| 4,984,970 | A | 1/1991 | Eickmann | |
| 5,059,101 | A | 10/1991 | Valavaara | |
| 5,073,096 | A * | 12/1991 | King | F04B 53/007 137/516.29 |
| 5,145,340 | A | 9/1992 | Allard | |
| 5,207,242 | A | 5/1993 | Daghe et al. | |
| 5,226,445 | A | 7/1993 | Surjaatmadja | |
| 5,362,215 | A * | 11/1994 | King | F04B 49/10 137/542 |
| 5,370,148 | A | 12/1994 | Shafer | |
| 5,507,219 | A | 4/1996 | Stogner | |
| 5,524,902 | A | 6/1996 | Cornette | |
| D383,053 | S | 9/1997 | Schrader et al. | |
| 6,164,318 | A | 12/2000 | Dixon | |
| 6,257,626 | B1 | 7/2001 | Campau | |
| 6,382,940 | B1 * | 5/2002 | Blume | F04B 53/007 277/435 |
| 6,419,459 | B1 | 7/2002 | Sibbing | |
| 6,544,012 | B1 | 4/2003 | Blume | |
| 6,641,112 | B2 | 11/2003 | Antoff et al. | |
| 6,910,871 | B1 | 6/2005 | Blume | |
| 7,140,211 | B2 | 11/2006 | Tremblay | |
| 7,168,440 | B1 | 1/2007 | Blume | |
| 7,186,097 | B1 | 3/2007 | Blume | |
| 7,290,560 | B2 | 11/2007 | Orr et al. | |
| 7,296,591 | B2 * | 11/2007 | Moe | F04B 53/109 137/454.4 |
| 7,335,002 | B2 | 2/2008 | Vicars | |
| 7,513,759 | B1 * | 4/2009 | Blume | F04B 53/007 137/512 |
| D616,966 | S | 6/2010 | Angell | |
| 7,789,133 | B2 | 9/2010 | McGuire | |
| 7,828,053 | B2 | 11/2010 | McGuire et al. | |
| 7,845,413 | B2 | 12/2010 | Shampine et al. | |
| D631,142 | S | 1/2011 | Angell | |
| 7,963,502 | B2 | 6/2011 | Lovell et al. | |
| 8,317,498 | B2 | 11/2012 | Gambier et al. | |
| 8,360,094 | B2 | 1/2013 | Steinbock et al. | |
| 8,528,462 | B2 | 9/2013 | Pacht | |
| 8,528,585 | B2 | 9/2013 | McGuire | |
| 8,701,546 | B2 | 4/2014 | Pacht | |
| 9,010,412 | B2 | 4/2015 | McGuire | |
| D731,035 | S | 6/2015 | Lo Cicero | |
| D737,497 | S | 8/2015 | Burgess et al. | |
| 9,188,121 | B1 | 11/2015 | Dille | |
| D748,228 | S | 1/2016 | Bayyouk et al. | |
| 9,371,919 | B2 | 1/2016 | Forrest et al. | |
| 9,260,933 | B2 | 2/2016 | Artherholt et al. | |
| 9,328,745 | B2 | 5/2016 | Bartlok et al. | |
| 9,416,887 | B2 | 8/2016 | Blume | |
| 9,435,454 | B2 | 9/2016 | Blume | |
| 9,534,473 | B2 | 1/2017 | Morris et al. | |
| 9,631,739 | B2 | 4/2017 | Belshan et al. | |
| D787,029 | S | 5/2017 | Bayyouk et al. | |
| 9,732,746 | B2 | 8/2017 | Chandrasekaran et al. | |
| 9,822,894 | B2 | 11/2017 | Bayyouk et al. | |
| D806,241 | S | 12/2017 | Swinney et al. | |
| 10,184,470 | B2 | 1/2019 | Barnett, Jr. | |
| 2002/0166588 | A1 | 11/2002 | Dean | |
| 2004/0170507 | A1 | 9/2004 | Vicars | |
| 2004/0234404 | A1 | 11/2004 | Vicars | |
| 2006/0002806 | A1 | 1/2006 | Baxter et al. | |
| 2006/0027779 | A1 | 2/2006 | McGuire et al. | |
| 2008/0006089 | A1 * | 1/2008 | Adnan | F04B 51/00 73/587 |
| 2008/0008605 | A1 | 1/2008 | Bauer et al. | |
| 2008/0093361 | A1 | 4/2008 | Kennedy et al. | |
| 2008/0279706 | A1 | 11/2008 | Gambier et al. | |
| 2010/0243255 | A1 | 9/2010 | Luharuka et al. | |
| 2011/0079302 | A1 | 4/2011 | Hawes | |
| 2011/0173814 | A1 | 7/2011 | Patel | |
| 2011/0189040 | A1 | 8/2011 | Vicars | |
| 2011/0206547 | A1 | 8/2011 | Kim et al. | |
| 2012/0063936 | A1 | 3/2012 | Baxter et al. | |
| 2012/0141308 | A1 | 6/2012 | Saini et al. | |
| 2012/0187321 | A1 * | 7/2012 | Small | F04B 53/1032 251/321 |
| 2013/0020521 | A1 | 1/2013 | Byrne | |
| 2013/0112074 | A1 | 5/2013 | Small | |
| 2013/0202458 | A1 | 8/2013 | Byrne et al. | |
| 2013/0319220 | A1 | 12/2013 | Luharuka et al. | |
| 2014/0127062 | A1 * | 5/2014 | Buckley | F04B 53/10 417/439 |
| 2014/0196883 | A1 | 7/2014 | Artherholt et al. | |
| 2014/0348677 | A1 | 11/2014 | Moeller et al. | |
| 2015/0084335 | A1 | 3/2015 | Farrell et al. | |
| 2015/0132157 | A1 | 5/2015 | Whaley et al. | |
| 2015/0144826 | A1 | 5/2015 | Bayyouk et al. | |
| 2016/0123313 | A1 | 5/2016 | Simmons | |
| 2016/0160848 | A1 | 6/2016 | Toppings et al. | |
| 2017/0002947 | A1 | 1/2017 | Bayyouk et al. | |
| 2017/0089473 | A1 | 3/2017 | Nowell et al. | |
| 2017/0204852 | A1 | 7/2017 | Barnett, Jr. | |
| 2017/0211565 | A1 | 7/2017 | Morreale | |
| 2018/0017173 | A1 | 1/2018 | Nowell et al. | |

(56) References Cited

U.S. PATENT DOCUMENTS

2018/0313456 A1  11/2018  Bayyouk et al.
2019/0011051 A1  1/2019  Yeung

OTHER PUBLICATIONS

Exhibit "A" includes cross-sectional views of fluid end assemblies known in the art prior to Sep. 29, 2015. 4 pages.
Exhibit "B" includes side views of valve seats known in the art prior to Sep. 29, 2015. 2 pages.
Exhibit "C" is a cross-sectional view of a plunger end of a fluid assembly known in the art prior to Sep. 29, 2015. 1 page.
Exhibit "D" includes an engineering drawing and pictures of a mud pump known in the art prior to Sep. 29, 2015. 4 pages.
International Search Authority "PCT International Search Report", Mar. 31, 2020, 3 pages, Korean Intellectual Property Office, Republic of Korea.
U.S. Patent and Trademark Office File History for U.S. Appl. No. 10/591,070, 168 pages, Alexandria, VA—See USPTO Records.
Exhibit B—Gradner Denver, Well Servicing Pump, Model GD-3000 Operating and Service Manual, dated Apr. 2011, (GD-3000), 44 pages.
Exhibit C—National Oilwell Varco 267Q-6M Quintuplex Plunger Pump Parts List, issued Sep. 6, 2000 and revised Jul. 21, 2008 (NOV-267Q), 13 pages.
Exhibit D (Part 1)—Declaration of William D. Marscher, PE, 209 pages.
Exhibit D (Part 2)—Declaration of William D. Marscher, PE, 124 pages.
Exhibit E—U.S. Patent and Trademark Office File History for U.S. Appl. No. 62/234,483, 45 pages, Alexandria, VA.
Exhibit F—U.S. Patent and Trademark Office File History for U.S. Appl. No. 62/315,343, 41 pages, Alexandria, VA.
Exhibit G—U.S. Patent and Trademark Office File History for U.S. Appl. No. 62/318,542, 44 pages, Alexandria, VA.
Exhibit H—U.S. Patent and Trademark Office File History for U.S. Appl. No. 62/346,915, 41 pages, Alexandria, VA.
U.S. Patent and Trademark Office File History for U.S. Appl. No. 10/591,070, 353 pages, Alexandria, VA—See USPTO Records.
U.S. Patent and Trademark Office File History for U.S. Appl. No. 15/719,124, 183 pages, Alexandria, VA—See USPTO Records.
Exhibit K—Susan Woods, Groove Milling, Cutting Tool Engineering, published Aug. 1, 2012, 11 pages.
Exhibit L—"Weir SPM General Catalog" (2009), 40 pages.
Exhibit M—Groovex, "Groove Milling, High Precision Tools for Groove Milling" brochure, Edition 04, dated Dec. 2012, 24 pages.
Exhibit N—Ricky Smith & R. Keith Mobley, Rules of Thumb for Maintenance and Reliability Engineers, 239-250 (2008), 15 pages.
Exhibit O—Ross Mackay, "Process engineering: Properly seal that pump", Chemical Processing, dated May 17, 2005, 11 pages.
Exhibit P—Vargus Ltd., "Groovex Groove milling", YOUTUBE (Dec. 12, 2011, https://www.youtube.com/watch? v=vrFzHJUXjvk, 68 pages.
Exhibit Q—Paresh Girdhar, Octo Moniz, & Steve Mackay, Centrifugal Pump Design, "lant and Process Engineering 360° C.", 521-536 (2004), 21 pages.
Exhibit R—Paresh Girdhar, Octo Moniz, & Steve Mackay, Centrifugal Pump Design and Construction, Practical "Centrifugal Pumps: Design, Operation and Maintenance", 18-47 (2005), 33 pages.
Exhibit S—Gardner Denver, "Well Servicing Pump", Model HD-2250 Operating and Service Manual, dated Jan. 2005, 44 pages.
Exhibit T—Robert Crosier, "Flush Free Sealing Benefits", Empowering Pumps & Equipment, dated Oct. 3, 2011, 5 pages.
Exhibit U—Cat "Quintuplex Well Stimulation Pump", WS255 (2013), 2 pages.
Exhibit V—Oxford "Dictionary of Mechanical Engineering", excerpted (2013), 10 pages.
Exhibit W—United States Patent and Trademark Office, Before the Patent Trial and Appeal Board, "*Cizion, LLC d/b/a Vulcan Industrial Manufacturing*, Petitioner v. *Kerr Maching Co.*, Patent Owner" Case PGR2020-00065 U.S. Appl. No. 10/591,070, Petition for Post-Grant Review of U.S. Appl. No. 10/591,070 Under 35 U.S.C. Section 321-329 and 37 C.F.R. Section 42,200 ET SEQ.—197 pages.

\* cited by examiner

SEALING HIGH PRESSURE FLOW DEVICES

BACKGROUND

This technology relates generally to sealing fluid flow passages inside flow control devices, such as those particularly suited for use in high pressure oil and gas production and processing systems.

One such type of flow control device is a valve. Generally, a valve forms a flow passage and has a selectively operable closure to open or close the flow passage in order to control a flow of fluid through the valve. The sealing integrity of high pressure valves must withstand not only high operating fluid pressures, presently 15,000 pounds per square inch and higher, but also must do so while controlling the flow of corrosive and/or abrasive fluids that are notorious for eroding the valve internal components in the oil and gas industry. Preferably, the valves can withstand pressures up to at least 22,500 pounds per square inch.

Illustrative embodiments herein are directed to a plug valve although the contemplated embodiments are not so limited. In a plug valve the flow passage typically includes a valve body in fluid communication with two or more openings, typically an inlet opening and an outlet opening, forming a flow passage through the valve body. A valve plug and insert segments, one type of a valve closure that is described herein, are disposed in a valve body bore between the inlet and outlet openings where sealing occurs between the plug, the insert, and the bore. The valve plug defines a through-opening and is selectively rotatable to an open position where the through-opening is aligned with the flow passage to permit a flow of fluid through the valve (from the inlet to the outlet), or to a closed position where the through-opening is misaligned with the flow passage to prevent the flow of fluid through the valve. Operating a valve in the harsh oilfield conditions can cause erosion of the valve body bore where the seal in the insert abrades against the bore, often resulting in leakage in a short amount of time. Repairing the valve body, such as by a weld build-up and machining operation, is a cumbersome and disruptive repair in the oilfield.

The illustrative embodiments of this technology directed to plug valves are in no way limiting of the contemplated embodiments of this technology. The skilled artisan understands that in alternative embodiments this technology can be used in other types of valves having differently configured closures. However, an enumeration of all the different types of valves that are suited for using this technology is not necessary for the skilled artisan to understand the scope of the claimed subject matter, so no such enumeration is warranted.

Besides valves, other types of high-pressure flow devices are also suited for practicing this technology. For example, a fluid end is used in many well servicing applications to contain high pressure, often corrosive and/or abrasive, fracturing fluids in the oil and gas industry. A fluid end typically has a manifold body and a number of components mounted and sealed to the body, such as the suction and discharge plugs, suction and discharge valve seats, stuffing box, discharge flange, and suction manifold; with those components either alone or sleeved as are illustratively described herein. Like the valves, operating a fluid end in the harsh oilfield conditions can cause erosion of the body resulting in leakage in a short amount of time. Repairing the body is also cumbersome and disruptive in the oilfield.

Improvements are needed in the internal sealing of high pressure flow devices to increase operating life while reducing downtime and operating cost. What is needed is a solution that transfers the erosion (corrosion and abrasion) from the high pressure fluid device body to the component sealed with the body. It is to those improvements that embodiments of this technology are directed as described in the illustrative embodiments and contemplated within the scope of the claims.

SUMMARY OF THE INVENTION

The present invention is directed to a fluid end assembly comprising a housing having an external surface and an internal chamber, and a first conduit formed in the housing and having first and second sections, each section independently interconnecting the internal chamber and the external surface. The fluid end assembly further comprises a second conduit formed in the housing, intersecting the first conduit and independently interconnecting the internal chamber and the external surface, and an endless groove formed in the wall or walls defining one of the conduits and extending concentrically around that conduit.

The present invention is also directed to a fluid end assembly comprising a housing having an internal chamber and a conduit that intersects the internal chamber and opens at a first surface of the housing, a plunger that reciprocates within the housing, and a seal positioned within an annular groove formed in the housing.

The present invention is further directed to a method for manufacturing a fluid end assembly. The method comprises the steps of providing a housing having an external surface, an internal chamber, a first conduit formed in the housing having first and second sections, and a second conduit formed in the housing, intersecting the first conduit and having third and fourth sections independently interconnecting the internal chamber and the external surface, and forming an endless groove in the walls or walls defining one of the sections such that the groove extends concentrically around that section.

The present invention is also directed to a fluid end assembly having a housing having an external surface and an internal chamber, a first conduit formed in the housing and having first and second sections, and a second conduit formed in the housing, intersecting the first conduit. The fluid end assembly further comprises a recessed corner section formed in the wall or walls defining one of the conduits and extending concentrically around that conduit. The corner element is sized to receive a sealing element therein. The fluid end assembly further comprises a stuffing box installed in the same conduit within which the corner section is formed and having a tubular side wall that fully overlies that corner section. Each conduit independently interconnects the internal chamber and the external surface.

BRIEF DESCRIPTION OF THE DRAWINGS

Details of various embodiments of the present technology are described in connection with the accompanying drawings that bear similar reference numerals.

DETAILED DESCRIPTION

Initially, this disclosure is by way of example only, not by limitation. The illustrative constructions and associated methods disclosed herein are not limited to use or application for sealing any specific assembly or in any specific environment. That is, the disclosed technology is not limited to use in sealing valves and fluid ends as described in the illustrative embodiments. Thus, although the instrumentalities described herein are for the convenience of explanation, shown and described with respect to exemplary embodiments, the skilled artisan understands that the principles herein may be applied equally in sealing other types of high pressure flow devices.

Figure 1:
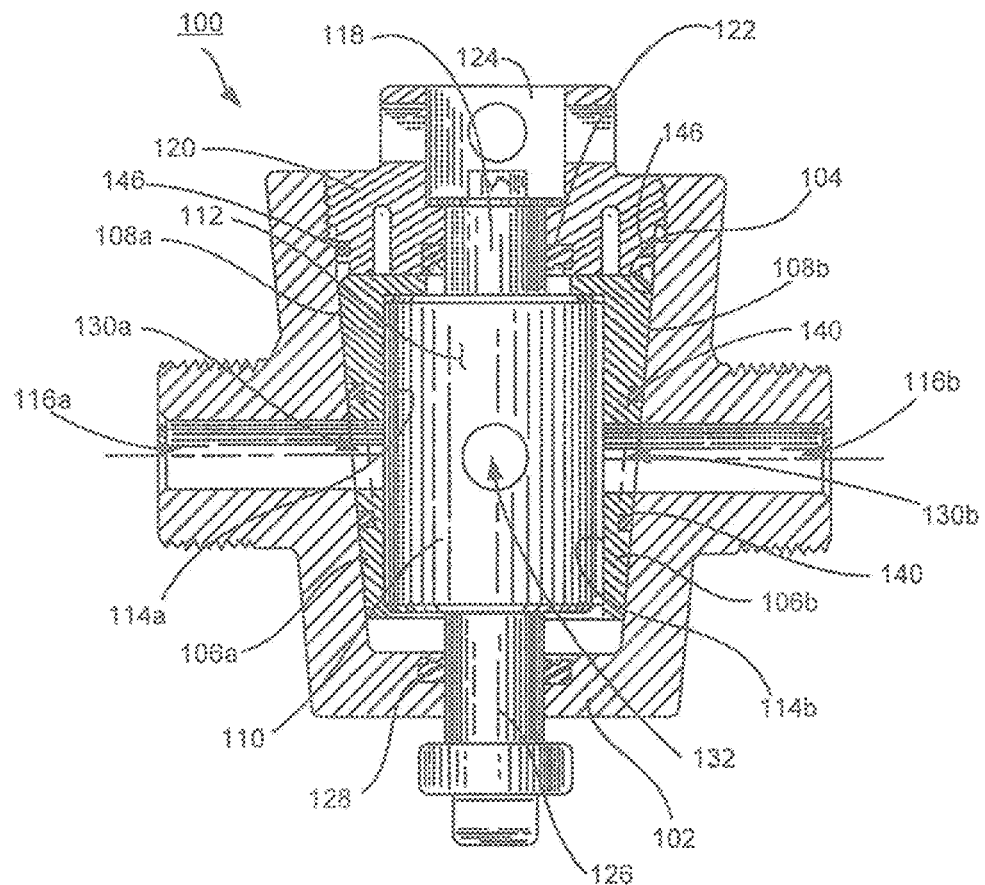
FIG. 1 is a cross-sectional depiction of a plug valve that is constructed in accordance with previously attempted solutions.

FIG. 1 is a cross-sectional depiction of a plug valve 100 that is constructed according to previously attempted solutions. The plug valve 100 has a forged valve body 102 forming a tapered internal bore 104. Inserts 106a, 106b in these illustrative embodiments are segments of an open hollow cone. Although two inserts 106a, 106b are depicted, the contemplated embodiments are not so limited because alternatively there can be more than two. Each insert 106a, 106b has an outer conical surface 108a, 108b forming a matching taper to engage against the bore 104 in a close mating relationship.

A cylindrical plug 110 has an outer diameter surface 112 sized to fill the space between the inserts 106, mating with an inner diameter surface 114a, 114b of the respective inserts 106. The plug 110 has a top journal 118 that is rotatable within a retaining nut 120. A packing 122 seals against the journal 118 to contain the pressurized fluid inside the valve 100 while permitting an external force to rotate the journal 118 and, in turn, the plug 110. In these illustrative embodiments a handle 124 is connected to the journal 118 to permit a user to manually rotate the plug 110. In alternative embodiments not depicted the journal 118 can be rotated by a powered actuator. The plug 110 also has a bottom journal 126 that rotates within the body 102 and is sealed by packing 128.

The body 102 also forms openings 116a, 116b intersecting the bore 104, typically referred to as an inlet and an outlet. For illustrative purposes of this description it is a given that the fluid flows through the valve 100 from left to right, or into the opening 1169a and out of the opening 116b. However, in practice either opening 116 can provide the inlet and the other opening 116 the outlet.

Each insert 106 forms a respective opening 130a, 130b, and the inserts 106 are mounted in the valve 100 so that the insert openings 130 are aligned with the respective valve body opening 116. The plug 110 forms a through-opening 132 permitting a user to selectively align the opening 132 with the openings 116. FIG. 1 depicts the closed position of the valve 100, where the plug no is rotated so that the through-opening 132 is misaligned with the openings 116.

Namely, in the closed position of the valve 100 depicted in FIG. 1, pressurized fluid connected to the opening 116a (inlet) impacts against the closed plug 110, sealing the backside of the plug in a metal-to-metal seal against the insert 106b and also sealing between a seal 140 mounted in the insert 106b between it and the valve body bore 104. Thus, in the closed position the pressurized fluid is blocked from flowing through the valve 100. By rotating the plug 110 to the open position (not depicted), its through-opening 132 comes into alignment with the openings 116, permitting the pressurized fluid to flow through the valve 100 via a flow passage established collectively by the valve body openings 116, the insert openings 130, and the valve plug through-opening 132.

Figure 2:
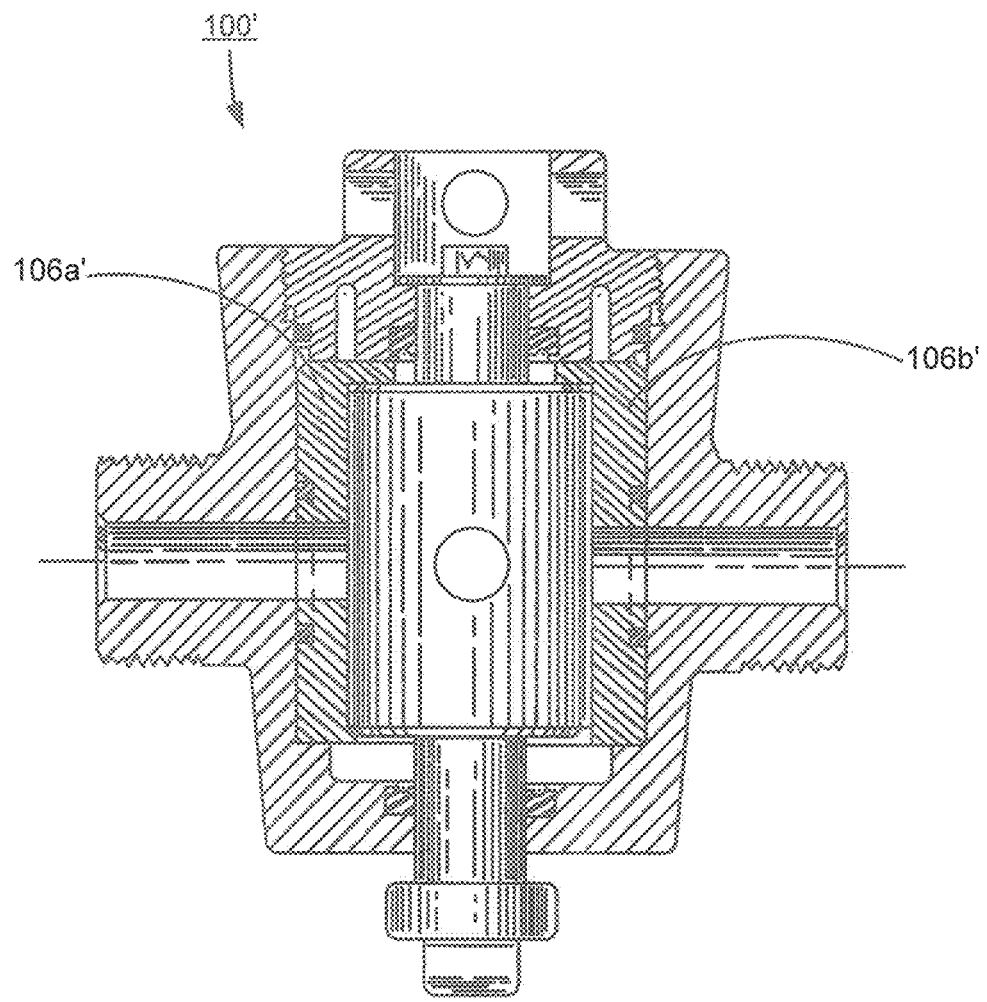
FIG. 2 is a cross-sectional depiction of another plug valve that is constructed in accordance with other previously attempted solutions.

FIG. 2 is similar to FIG. 1 but depicting a top entry plug valve 100' that is constructed in accordance with other previously attempted solutions. The plug valve 100' has inserts 106a', 106b' that are formed as segments of an open hollow cylinder instead of the inserts 106a, 106b in FIG. 1 that are segments of an open hollow cone. In other words, the conical surfaces in FIG. 1 are replaced here with cylindrical surfaces. Due to this, the inner body of the plug valve 100' is not tapered, unlike the plug valve 100. For purposes of this description the skilled artisan understands that the details of construction and use of this technology applies equivalently to both types of these valves, as well as other types of valves that are used to control highly pressurized fluid. Thus, the skilled artisan understands the scope of the claims from this description's comparison to the details of construction for just one of the previously attempted solutions.

Figure 3:
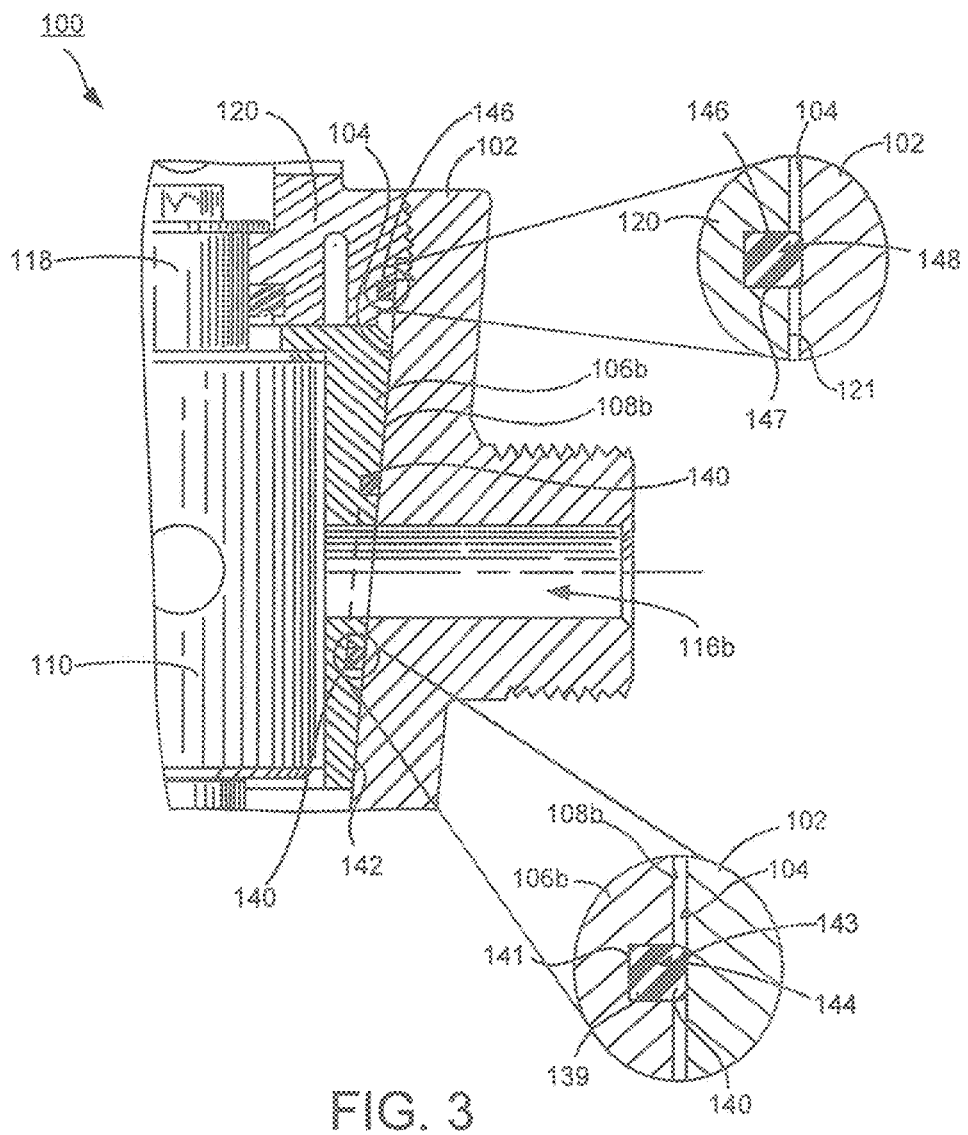
FIG. 3 depicts enlarged portions of the plug valve in FIG. 1.

Continuing with the previously started description in comparison to the previously attempted solutions depicted in FIG. 1, FIG. 3 is an enlarged portion of it more particularly depicting how the high pressure fluid is contained inside the valve 100 in part by the seal 140 that is compressed between the outer conical surface 108b of the insert 106b and the valve body bore 104.

The insert 106b has a surface 139 defining a recess 144 intersecting the outer conical surface 108b. The term "intersecting" for purposes of this description and meaning of the claims means that the recess 144 forms a gap in the outer surface 108b of the insert 106b. That intersecting construction of the recess 144 with the surface 108b permits mounting a fixed end 141 of the seal 140 in the recess 144, and sizing the seal 140 so that a distal end 143 extends from the recess 144 beyond the outer conical surface 108b in order to seal against the valve body bore 104. Importantly, this requires the bore 104 to define a sealing surface 142 against which the seal 140 in the insert 106b presses against to effect the sealed engagement of the insert 106b against the bore 104. Corrosive and/or abrasive fluid can become trapped between the seal 140 (mounted in the insert 106b) and the bore 104 causing erosion of the bore 104. The seal 140 in these embodiments is referred to as an axial seal because the compressive forces from the surface 108b on one side and the bore 104 on the other side act in an axial direction relative to the annular seal 140.

Although the embodiments of FIG. 3 depict only one annular seal 140 surrounding the outlet 116b, the previously attempted solutions are not so limited. The skilled artisan understands that in alternative constructions more than one seal can be used to provide redundancy. The seal 140 can be an elastomeric seal, and in other embodiments other kinds of seals can be used such as metal seals, spring seals, and the like.

To enclose the valve plug 110 and support the journal 118, a retaining nut 120 is threaded to the valve body 102. The retaining nut 120 seals to the valve body bore 104 by another seal 146. Similar to the insert 106b, the retaining nut 120 has a surface 147 defining a recess (sometimes referred to as a "gland") 148 intersecting an outer diameter surface 121 of the retaining nut 120. The seal 146 is supported in the recess 148 and is sized to extend beyond the outer surface 121 to seal against a sealing surface formed by the valve body bore 104. The seal 146 in these embodiments is referred to as a radial seal because the compressive forces from the cap's surface 121 on one side and the bore 104 on the other side act in a radial direction relative to the annular seal 146. Although a radial seal is depicted, in alternative embodiments an axial seal or a crush seal and the like can be used instead of or in addition to the radial seal.

Figure 4:
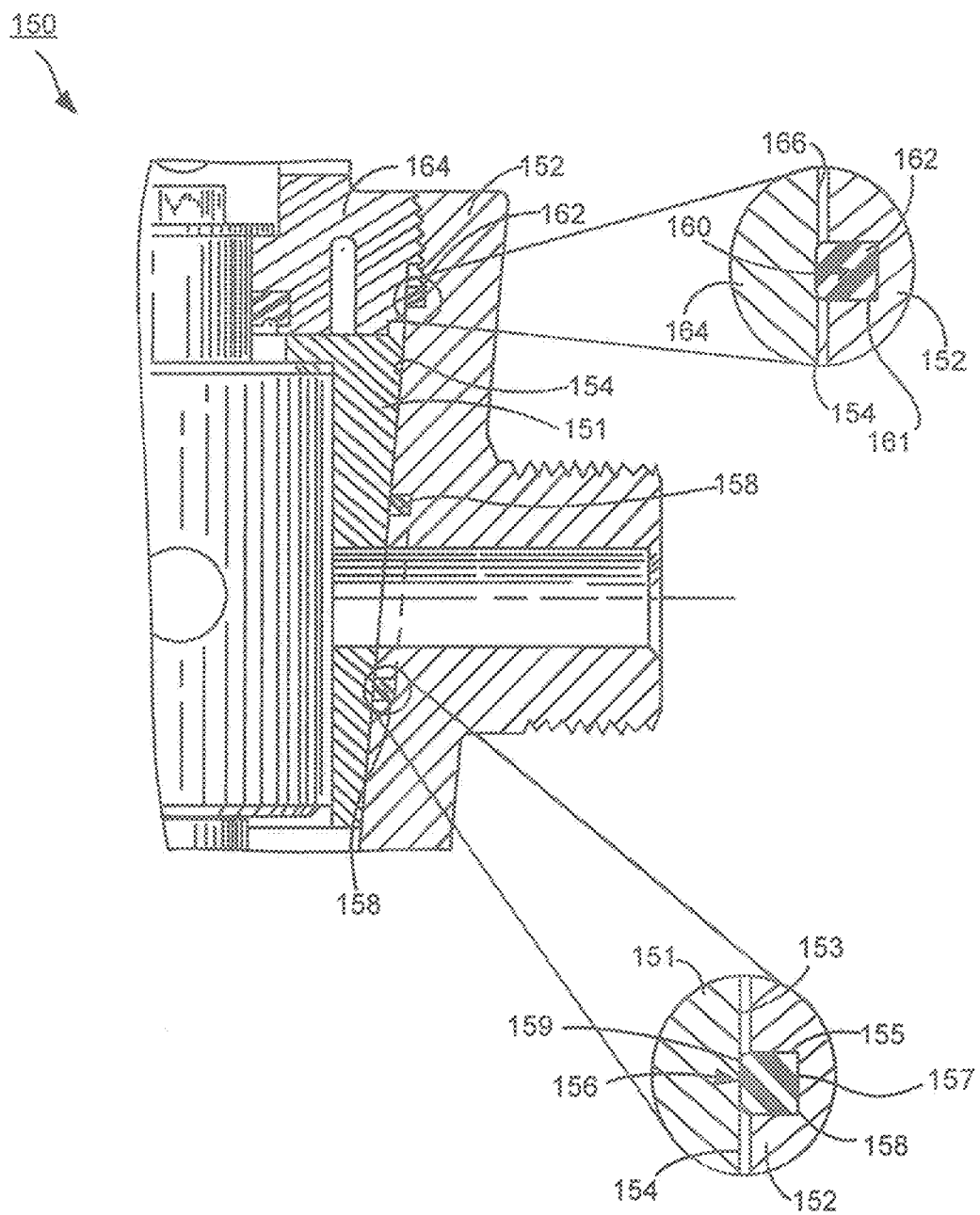
FIG. 4 depicts enlarged portions similar to FIG. 3 but of a plug valve that is constructed in accordance With embodiments of this technology.

In comparison, FIG. 4 is similar to FIG. 3 but depicts a portion of a valve 150 that is constructed in accordance with embodiments of this technology. Here an insert 151 is similar in some respects but does not have a seal mounted to it like the insert 106b (FIG. 3). Particularly, the insert 151 has an outer conical segment surface 153 that does not form a recess for mounting a seal. There is no gap in the surface 153 where a recess intersects for mounting a seal. Instead, a valve body 152 defines a valve body bore 154, and also has a surface 155 defining a recess 156 intersecting the bore 154. Again, the term "intersecting" for purposes of this description and meaning of the claims means that the recess 156 includes a gap in the bore 154. Particularly, a fixed end 157 of a seal 158 is mounted in the recess 156, and because the recess 156 intersects the bore 154, the seal 158 can be sized to extend from the recess 156 beyond the bore 154 so that a distal end 159 of the seal 158 seals against a sealing surface formed by the insert 151.

Corrosive and/or abrasive fluid can become trapped between the seal 158 (mounted to the body 152) and the insert 151 causing erosion of the outer cylindrical surface of the insert 151. Importantly, in comparison to the previously attempted solutions, the construction of FIG. 4 advantageously transfers the erosion wear from the bore 154 (of the body 152) to the insert 151. When erosion has progressed to the extent that leakage occurs, repairing or replacing the insert 151 is significantly less complex and less expensive than repairing the body 152.

The body 152 also has a surface 161 forming another recess 160 that intersects the valve body bore 154. A seal 162 is mounted to the body 152 in the recess 160. Again, because of the intersecting construction of the recess 160 and the bore 154, the seal 162 can be sized to extend beyond the bore 154 to seal against a sealing surface formed by a retaining nut 164. Unlike the retaining nut 120 in FIG. 3, retaining nut 164 does not have a seal mounted to it. Instead, the seal 162 is mounted to the valve body 152 and is sized to extend from the recess 160 to seal against the outer diameter surface 166 of the retaining nut 164. In the same way as described above, this technology transfers the erosion wear away from the body 152 to the less complex and less expensive mating component, in this case the retaining nut 164.

Figure 5:
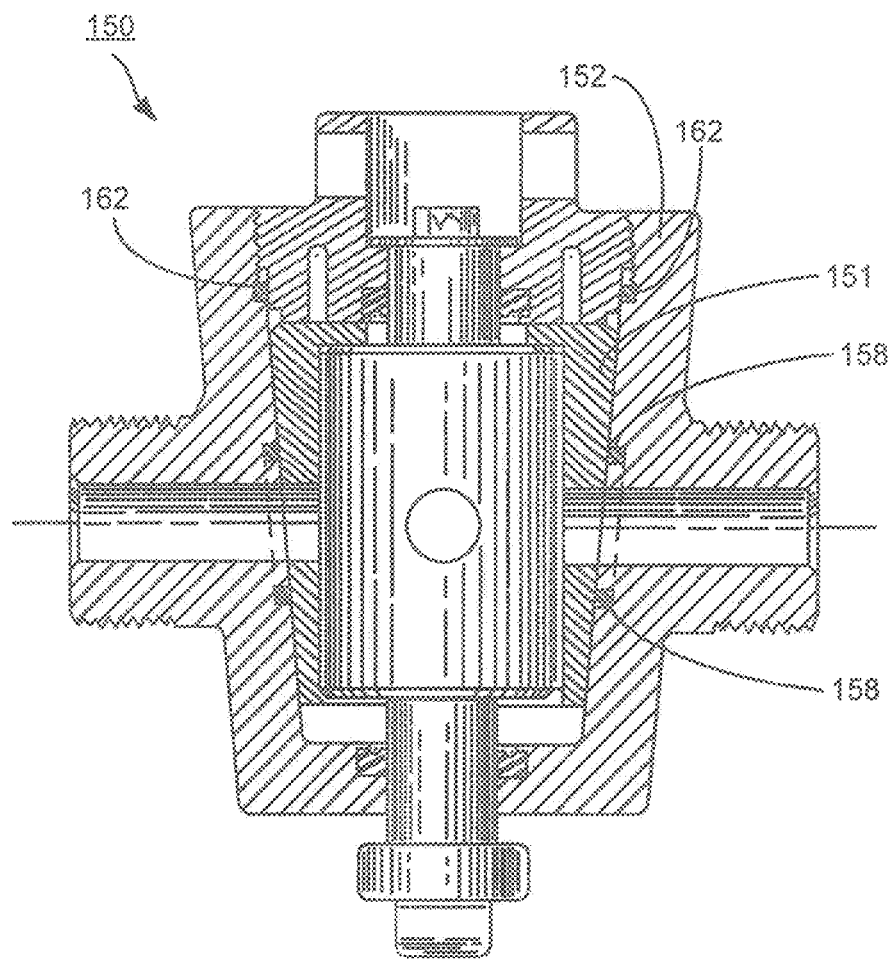
FIG. 5 depicts more of the plug valve of FIG. 4.
Figure 6:
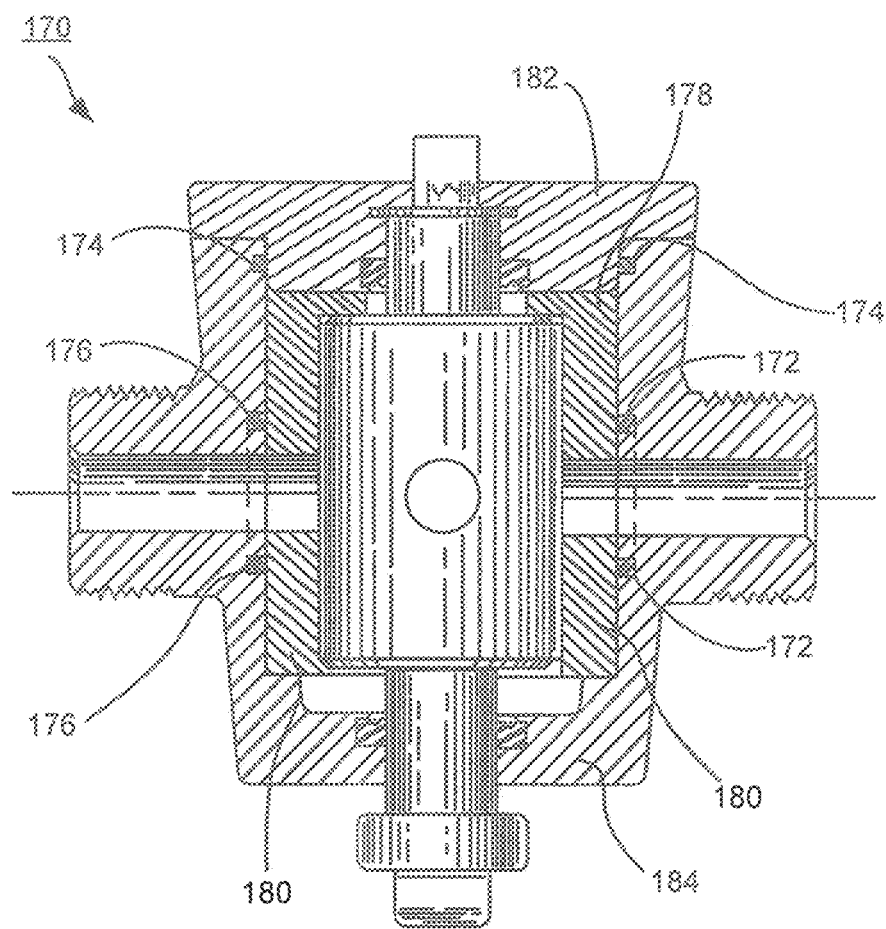
FIG. 6 is a cross-sectional depiction of another plug valve that is constructed in accordance with this technology.

FIG. 5 is a simplified depiction of the valve 150 that is constructed in accordance with the present technology. The skilled artisan understands that variations in construction are encompassed within the contemplated embodiments of this technology that are represented in the illustrative embodiments. For example, FIG. 6 depicts another valve 170 that is constructed in accordance with this technology because each of the seals 172, 174, 176 are mounted in respective recesses formed in the valve body 184 and intersecting the valve body bore 178. The seals 172, 174, 176 are configured to extend away from the respective recesses to seal against sealing surfaces of the inserts 180 and the retaining nut 182, correspondingly. Unlike the previously attempted solutions, this construction eliminates the erosion caused by mounting a seal to a mating component that seals against the valve body bore 178.

Figure 7:
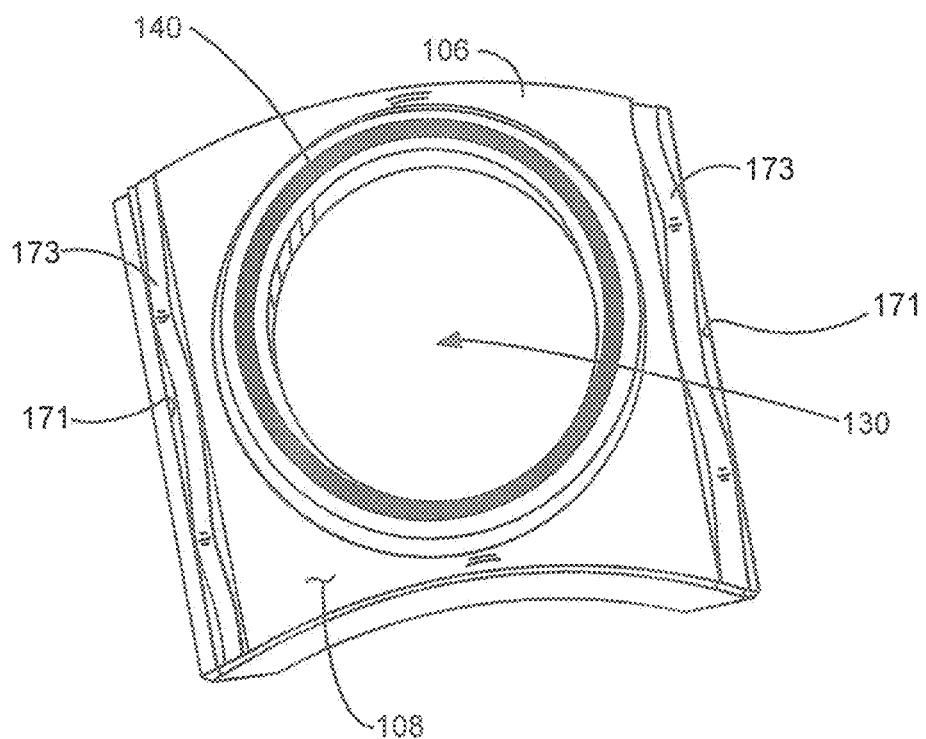
FIG. 7 is an isometric depiction of a valve insert in the plug valve depicted in FIG. 1.

FIG. 7 is an isometric depiction of the insert 106 in the previous valve design depicted in FIG. 1. In these embodiments the insert 106 defines slots 171 intersecting the outer conical surface 108 of the insert 106. A spring 173 is mounted to the insert 106 in each slot 171 and extends from the slot 171 to contact the valve body bore 104 (FIG. 1). As described above, that construction of the previously attempted solutions, by design, makes the valve body bore 104 the sacrificial member for any erosion caused by the springs 173.

Figure 8:
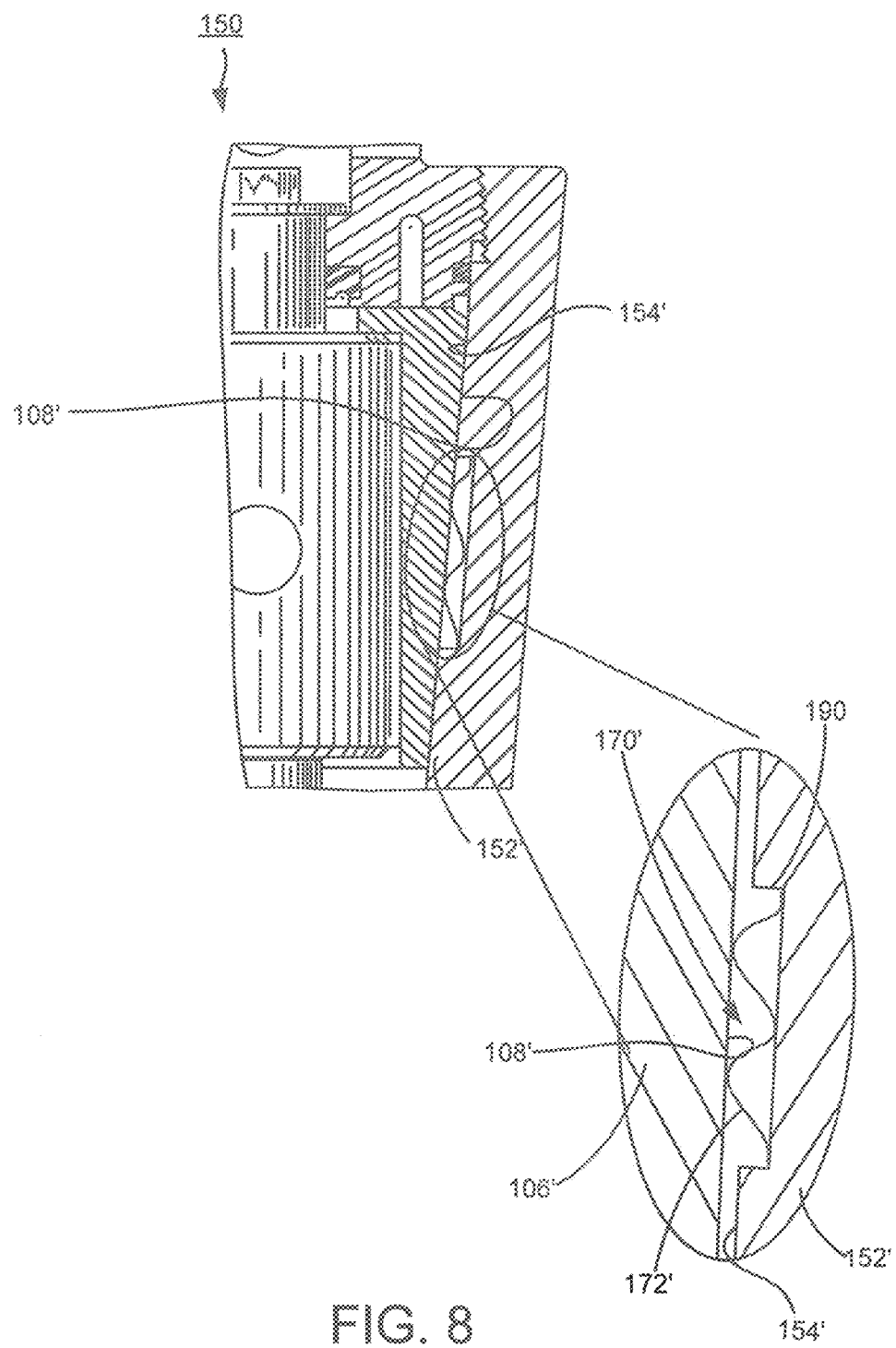
FIG. 8 is similar to FIG. 7 but depicting a different cross-section through the plug valve.

FIG. 8 depicts a portion of the valve 150 (of this technology) in FIG. 5, but at a different cross section that passes through a recess 170' defined by a surface 190 formed by the valve body 152'. The recess 170' intersects the valve body bore 154' so that a spring 172' can be mounted in the recess 170' at a fixed end and sized to extend from the recess 170' to pressingly engage against an outer conical surface 108' of the insert 106'. Like described above, this technology transfers the wear from the valve body bore 154' to the less complex and less expensive insert 106'.

Returning momentarily to FIG. 5 that depicts the plug valve 150 constructed in accordance with embodiments of this technology. The skilled artisan having read this description understands that this technology transfers the erosion wear from the bore of the body 152 to the outer conical surface of the insert 151. As described, leakage can occur because the free end of the seal 158 abrades away the outer conical surface of the insert 151. In some illustrative embodiments the repair procedure can entail resurfacing the insert 151 to provide a new sealing surface for the seal 158 mounted in the body 152. Alternatively, the insert 151 can simply be replaced with a new one.

In yet other alternative embodiments a disposable wear member can be provided between the outer conical surface of the insert 151 and the bore of the body 152. For purposes of this description and the claims the disposable wear member can be a disposable liner (not depicted) with one surface facing the bore of the body 152 to function effectively the same as the outer conical surface of the insert 151. In some embodiments an opposing inner surface of the liner can mate directly to the outer conical surface of the insert 151. Alternatively, a seal can be provided between the inner surface of the liner and the outer conical surface of the insert. That seal can be mounted to the insert and extending to seal against a sealing surface formed by the liner (such as by using the insert 106 in FIG. 1), or the seal can be mounted to the inner surface of the liner and extending to seal against a sealing surface formed by the outer surface of the insert.

Figure 9:
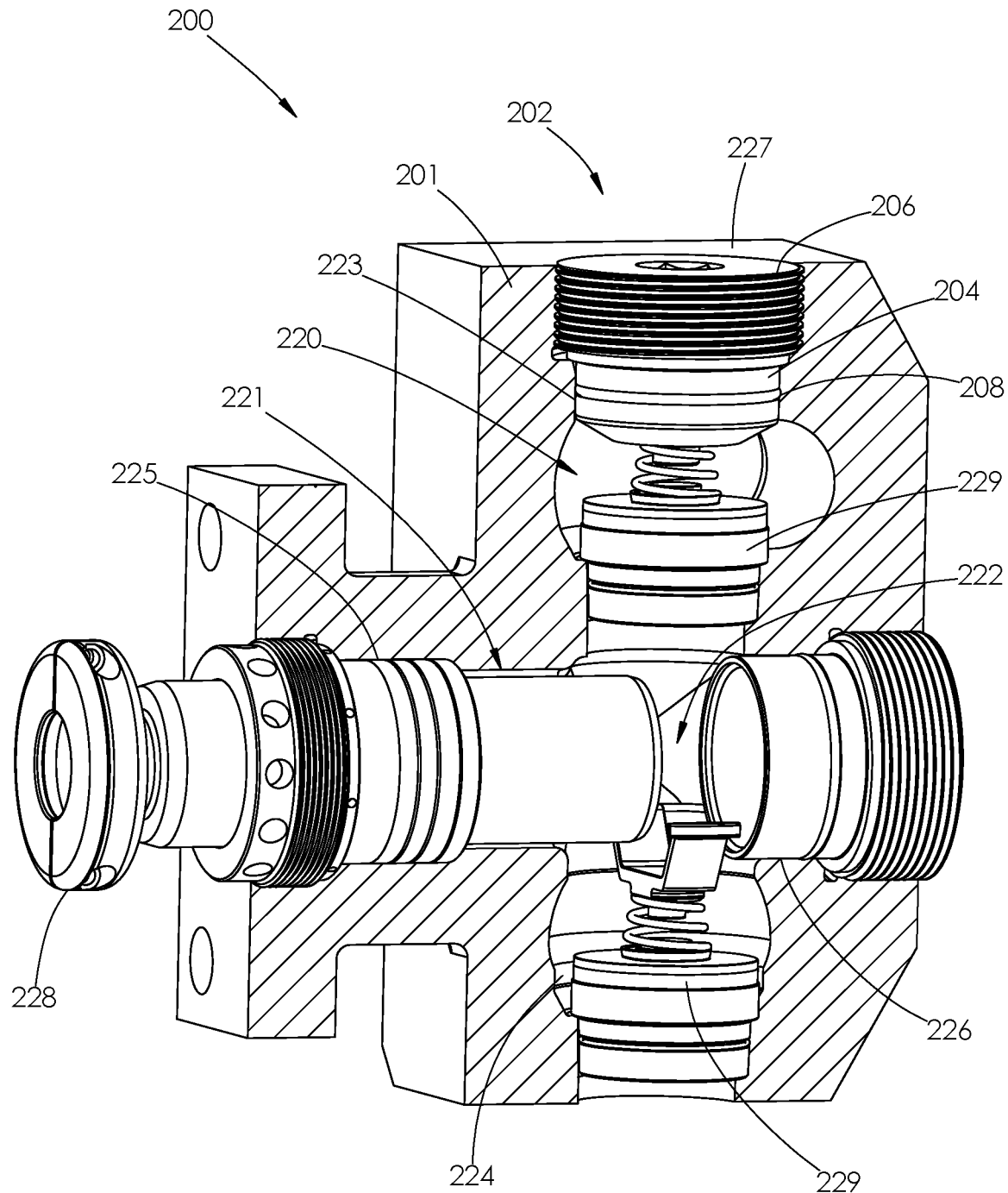
FIG. 9 is an isometric depiction of a fluid end that is constructed in accordance with embodiments of this technology.

Turning to another type of flow device that is well-suited for practicing this technology, FIG. 9 is a simplified isometric cross-sectional depiction of a hydraulic fracturing fluid end 200 that is constructed in accordance with previously attempted solutions. The fluid end 200 is generally a manifold 201 used to deliver highly-pressurized corrosive and/or abrasive fluids, typically used in hydraulic fracturing processes in the oil and gas industry. Fluid may pass through the fluid end 200 pressures that range from 5,000-15,000 pounds per square inch (psi). Fluid ends 200 used in high pressure hydraulic fracturing operations typically move fluid at a minimum of 8,000 psi. However, normally, the fluid end 200 will move fluid at pressures around 10,000-15,000 psi.

The manifold body or housing 201 typically has a first conduit 220 and a second conduit 221 formed within the body 201 that intersect to form an internal chamber 222. The first conduit 220 is typically orthogonal to the second conduit 221. The first conduit 220 may have aligned first and second sections 223 and 224 that are situated on opposite sides of the internal chamber 222. Likewise, the second conduit 221 may have aligned third and fourth sections 225 and 226 that are situated on opposite sides of the internal chamber 222. The sections 223, 224, 225, and 226 each may independently interconnect the internal chamber 222 to an external surface 227 of the fluid end 200.

A plunger 228 reciprocates within the body 201 to increase the pressure of fluid being discharged from the fluid end 200. As shown in FIG. 9, the plunger 228 may be disposed within the third section 225 of the second conduit 221. The plunger 228 is powered by an engine operatively engaged with the fluid end 200. In high pressure hydraulic fracturing operations, the engine preferably has a power output of at least 2,250 horsepower. Valve seats 229 are also shown within the first conduit 220. The valve seats 229 may support valves, such as a ball valve, used to control the movement of high pressure fluid within the body 201.

There are sealing areas in the fluid end 200 that experience the kind of erosion issues described above in plug valves. Similar to the conventional plug valve 100 depicted in FIG. 1, a number of components seal to the manifold body 201. Here, again, the sacrificial member for erosion, by design, is the body 201 instead of the less complex and less expensive mating component.

Figure 10:
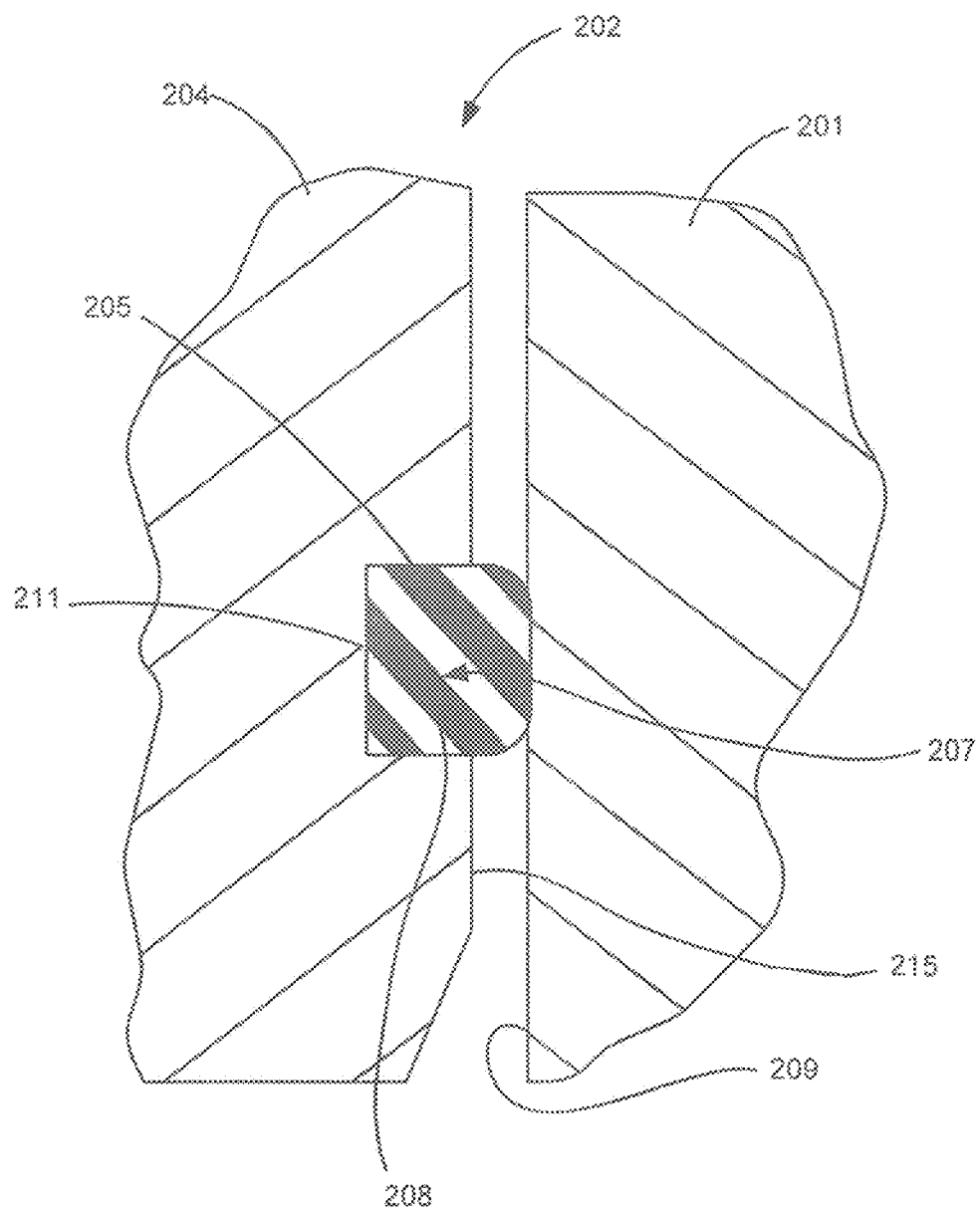
FIG. 10 is an enlarged depiction of a portion of the fluid end of FIG. 9.

For example, the body 201 defines a discharge opening 202 that opens into the first conduit 220. The discharge opening 202 depicted in these embodiments is sealed closed by inserting a closure or discharge plug or cover 204 into the conduit 220 and securing it by advancing a retaining nut 206 into the body 201. The discharge plug 204 supports a seal 208 that seals against the bore defining the discharge opening 202. FIG. 10 is a simplified cross-sectional depiction of the discharge plug 204 that has a surface 205 defining a recess 207 into which the seal 208 is mounted at an inner radial surface 211 of the radial seal 208.

In these illustrative embodiments the recess 207 is rectangular but the contemplated embodiments are not so limited. The skilled artisan understands that the configuration of the recess 207 is largely determined by what shape is required to mount the type of seal selected. The recess 207 intersects an outer surface 215 of the discharge plug 204, permitting the seal 208 to be sized so that a portion not mounted within the recess 207 extends beyond the outer surface 215 to pressingly engage against the bore 209 defining the discharge opening 202. In this construction the highly-pressurized corrosive and/or abrasive fluid can harsh fluid can be injected between the seal 208 and the bore 209, causing erosion of the seal surface formed by the bore 209.

This technology transfers that erosion wear from the body bore 209 to the less complex and less expensive discharge plug 204.

Fluid end bodies have conventionally been made of heat-treated carbon steel, so it was not uncommon for the body 201 to crack before any sacrificial erosion of the body progressed to the point of creating leakage between the discharge plug 204 and the bore 209. However, progress in the technology has introduced stainless steel body construction resulting in a significantly longer operating life. As a result, this erosion is no longer negligible but is instead a consideration for reducing erosion in modern fluid end construction. One leading source of bore 209 erosion in conventional fluid ends is the seal 208 mounted in the discharge plug 204 and extending therefrom to seal against a sealing surface formed by the body 201.

Figure 11:
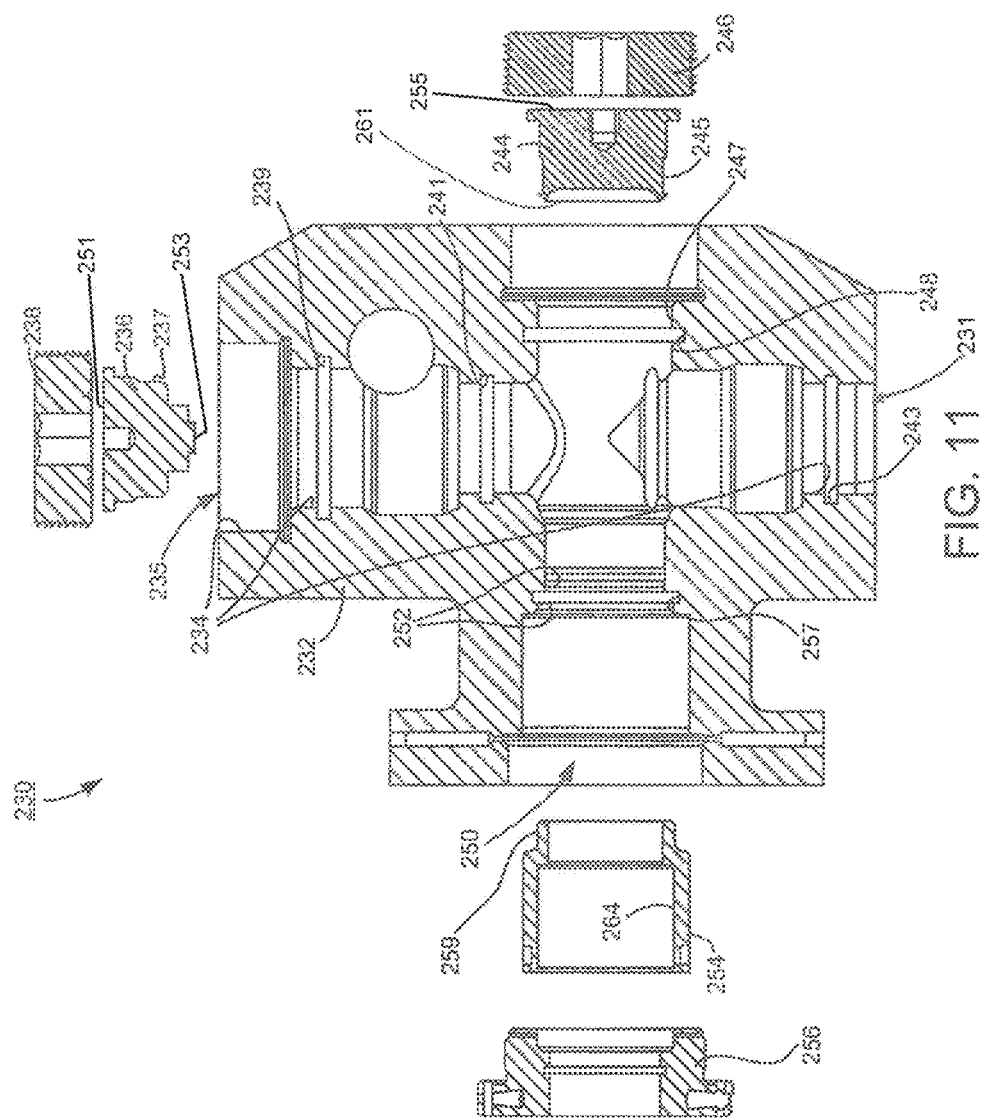
FIG. 11 is an exploded cross-sectional depiction of a fluid end that is constructed in accordance with embodiments of this technology.

FIG. 11 is an exploded cross-sectional depiction of a fluid end 230 that is constructed in accordance with this technology to, in numerous places, transfer the erosion wear from the body to the less complex and less expensive component that is sealed to the body. A manifold body 232 forms a number of interconnected bores or conduits, including a first conduit or discharge bore 234 forming a discharge opening 235 that is similar to the discharge opening 202 in the conventional fluid end 200 depicted in FIG. 9. The discharge bore 234 further defines an intake opening 231 formed opposite the discharge opening 235. The term "discharge bore" for purposes of this description means the surface defining the discharge opening 235 into which a closure or discharge plug 236 and a retaining nut 238 are installed, and the surface defining the intake opening 231. For clarity, although FIG. 11 references the discharge bore 234 as defining an upper end of the discharge opening 235 where the retaining nut 238 attaches, the discharge bore 234 also references lower portions of the discharge opening 235 where the discharge plug 236 seals to the body 232 and where the valve seat (not depicted) seals to the body 232. Likewise, the discharge bore 234 also references upper portions of the intake opening 231. Generally, for purposes of this description the discharge bore 234 forms multi-dimensional diameters at different longitudinal locations of the discharge opening 235 and intake opening 231.

The discharge opening 235 is sealed closed by inserting the discharge plug 236 into the discharge opening 235 and securing it in place by advancing the retaining nut 238. Unlike the conventional plug 204 in FIG. 9, however, the plug 236 does not have a seal mounted to it that seals against the bore 234. Instead, the plug 236 defines a sealing surface 237 for a seal (not depicted in FIG. 11) that is mounted in an endless groove or recess formed by a surface 239 of the body 232. The sealing surface 237 is axially spaced between a first surface 251 and an opposite second surface 253 of the plug 236.

Figure 12:
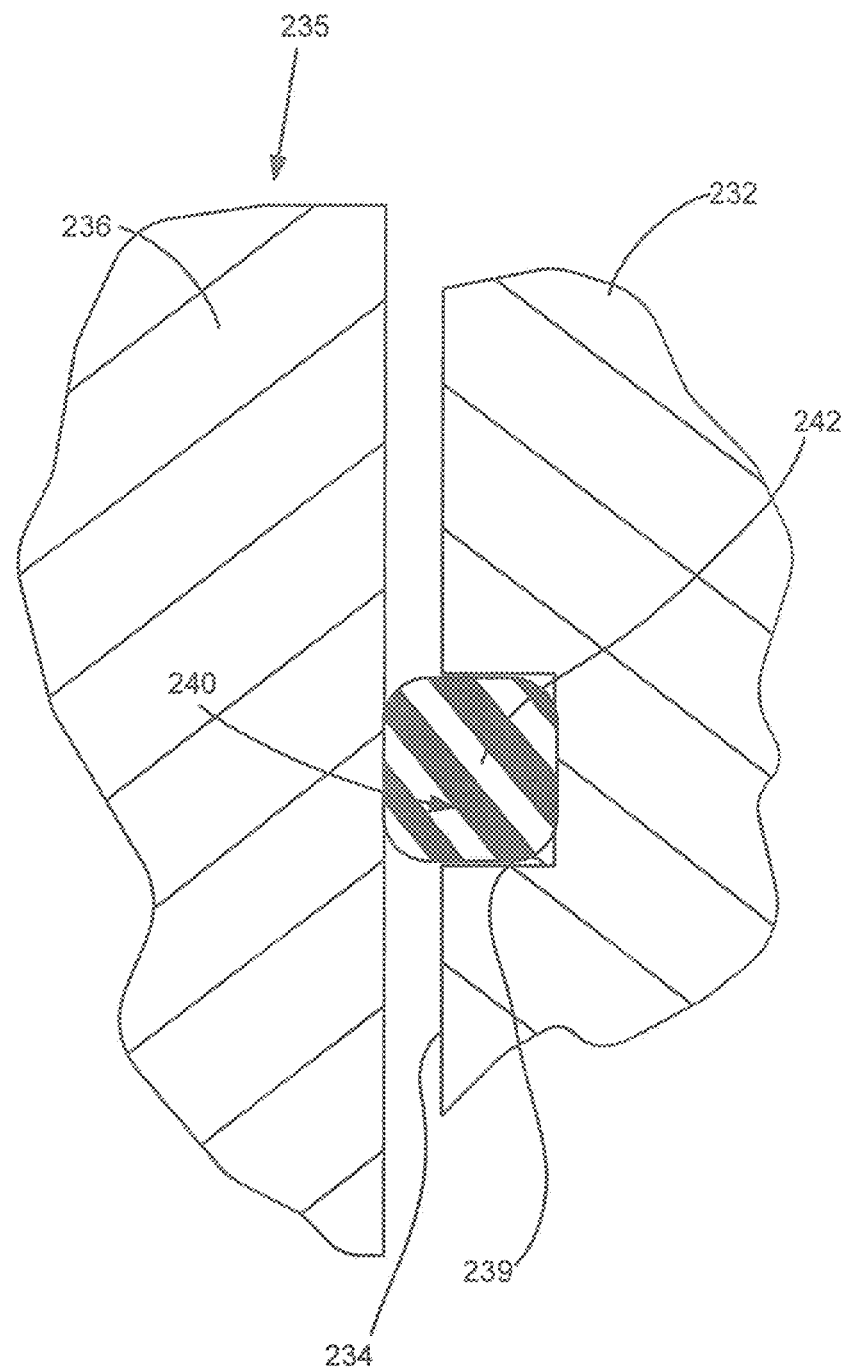
FIGS. 12 and 13 are enlarged depictions of portions of the fluid end of FIG. 11.

FIG. 12 is a simplified cross-sectional enlargement depicting the construction of the seal positioned within the surface 239 of the body 232. The surface 239 forms an endless groove or recess 240 that intersects the discharge bore 234. A seal 242 in these illustrative embodiments is mounted in the recess 240 to include an outer radial surface, and is thereby supported by the body 232. The recess 240 is characterized by a pair of parallel sidewalls joined by a base. The recess 240 opens towards a centerline of the conduit within which it is formed. Alternatively, as shown by recess 266 in FIGS. 14-15, the recess may open in a direction parallel to a centerline of the conduit within which it is formed. As above, the rectangular-groove shape of the recess 240 is merely illustrative and not limiting of the contemplated embodiments. Any shape necessary to properly mount a desired seal is contemplated, whether the seal is elastomeric, spring, metal, and the like. As above, the recess 240 intersects the bore 234 permitting the seal 242 to be sized so that a portion of the seal 242 not contained in the recess 240 extends beyond the recess 240 and beyond the bore 234 to pressingly seal against the sealing surface 237 (FIG. 11) defined by the discharge plug 236.

This seal construction depicted in FIG. 12 transfers the erosion wear from the body to the discharge plug. That significantly improves fluid end operations because repairs involving the discharge plug 236 are significantly less complex and less expensive than repairs involving the body 232, which typically involve weld-repair. Furthermore, weld-repairing the body 232 makes it susceptible to premature fatigue cracking in the repaired area. Further, even more operating life can be achieved by applying an erosion-resistant surface treatment to the plug 236, such as a high velocity oxygen fuel (HVOF) treatment, a tungsten carbide coating, material carburizing, and the like. Replacing instead of repairing an eroded discharge plug 236 is typically feasible, making it advantageously possible to repair a leaking valve constructed according to this technology in the field and thereby significantly reducing down time.

Returning to FIG. 11, the body 232 has a surface 241 defining an endless groove or recess intersecting the bore 234 and configured to mount a seal (not depicted) that extends from the recess to seal against a sealing surface formed by a discharge valve seat (not depicted). Similarly, the body 232 has a surface 243 forming another endless groove or recess intersecting the bore 234 and configured to mount another seal (not depicted) that is sized to extend from the recess to seal against a sealing surface formed by a suction valve seat (not depicted). The multiple references to a same bore 234 is for purposes of ease of description and is not narrowing of the contemplated embodiments of this technology. Whether the recesses defined by surfaces 241, 243 are formed in the same bore or different bores does not alter the scope of the contemplated embodiments directed to the recess for mounting the seal is formed in the body, and a seal is mounted in the recess and from there seals against a sealing surface of a component in a sealing engagement therebetween.

Similarly, a suction bore 247 is sealed closed by inserting a closure or suction plug or cover 244 defining a sealing surface 245 and securing it in place by advancing a retaining nut 246 in the body 232. Like the plug 236, the sealing surface 245 is axially spaced between a first surface 255 and an opposite second surface 261 of the plug 244. Again, the body 232 in these illustrative embodiments has a surface 248 forming an endless groove or recess intersecting the bore 247 and configured for mounting a seal (not depicted) extending from the recess and sealing against the sealing surface 245 of the suction plug 244. That transfers the wear from the body 232 to the suction plug 244 in comparison to previously attempted solutions and in accordance with the embodiments of this technology.

The body 232 also forms a plunger opening 250 sized to closely receive a stuffing box sleeve 254 that is sealed in place by advancing a retaining nut 256. The stuffing box sleeve 254 is characterized by a tubular sleeve. The plunger 228, shown in FIG. 9, may be disposed within the stuffing box sleeve 254.

The opening 250 is formed in part by the plunger bore 252 having a surface 257 defining an endless groove or recess intersecting the bore 252, into which a seal (not depicted) is mounted in these illustrative embodiments. The suction bore 247 and the plunger bore 252 together form the second conduit. Although these illustrative embodiments use a radial seal, the contemplated embodiments are not so limited. In alternative embodiments other types of constructions are contemplated by this technology employing axial seals, crush seals, and the like.

Figure 13:
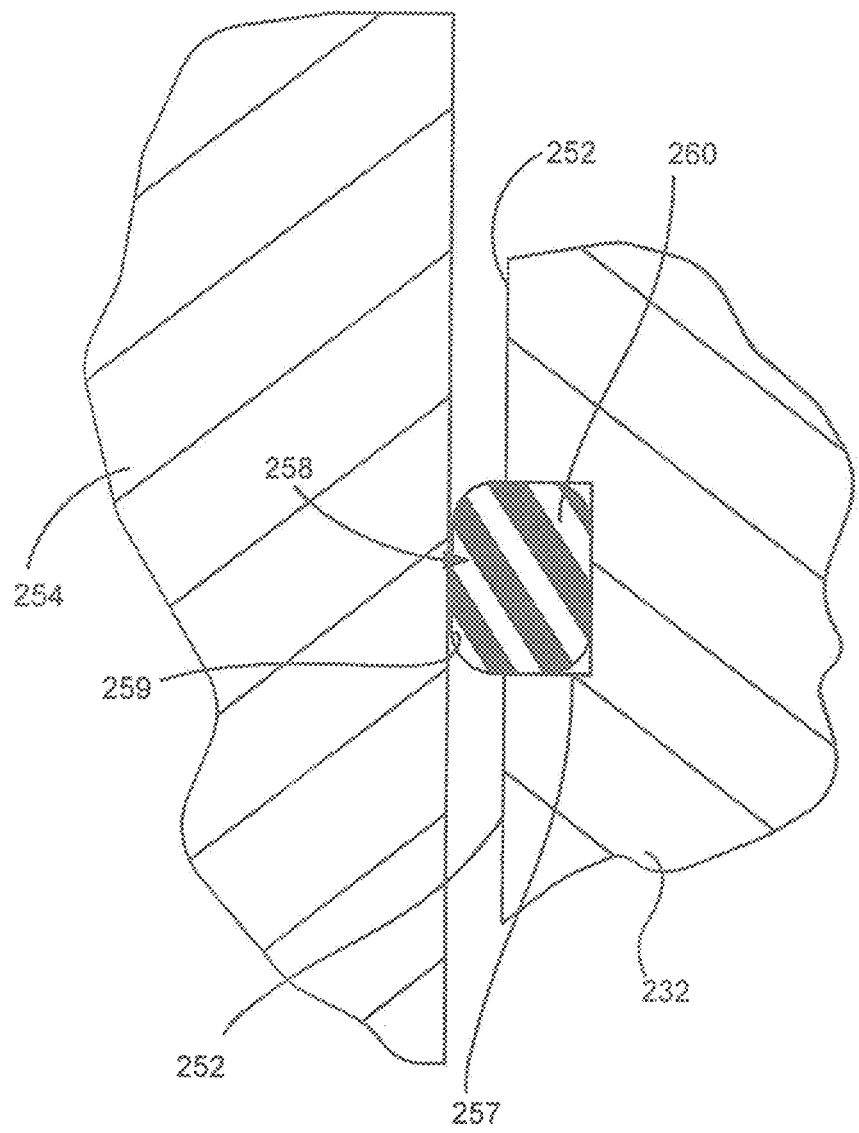

FIG. 13 is a simplified cross-sectional depiction of the body 232 having the surface 257 forming the recess 258. Again, the recess 258 intersects the body bore 252 permitting a portion including an outer radial surface of a radial seal 260 to be mounted in the recess 258. Another portion of the seal 260 not mounted in the recess 258 extends from the recess 258 to pressingly seal against the sealing surface 259 of the sleeve 254. Although in these depicted embodiments a radial seal is used, the contemplated embodiments are not so limited. The skilled artisan readily understands that other types of seals could be used instead of or in addition to the radial seal depicted, such as axial seals, crush seals, and the like.

Figure 14:
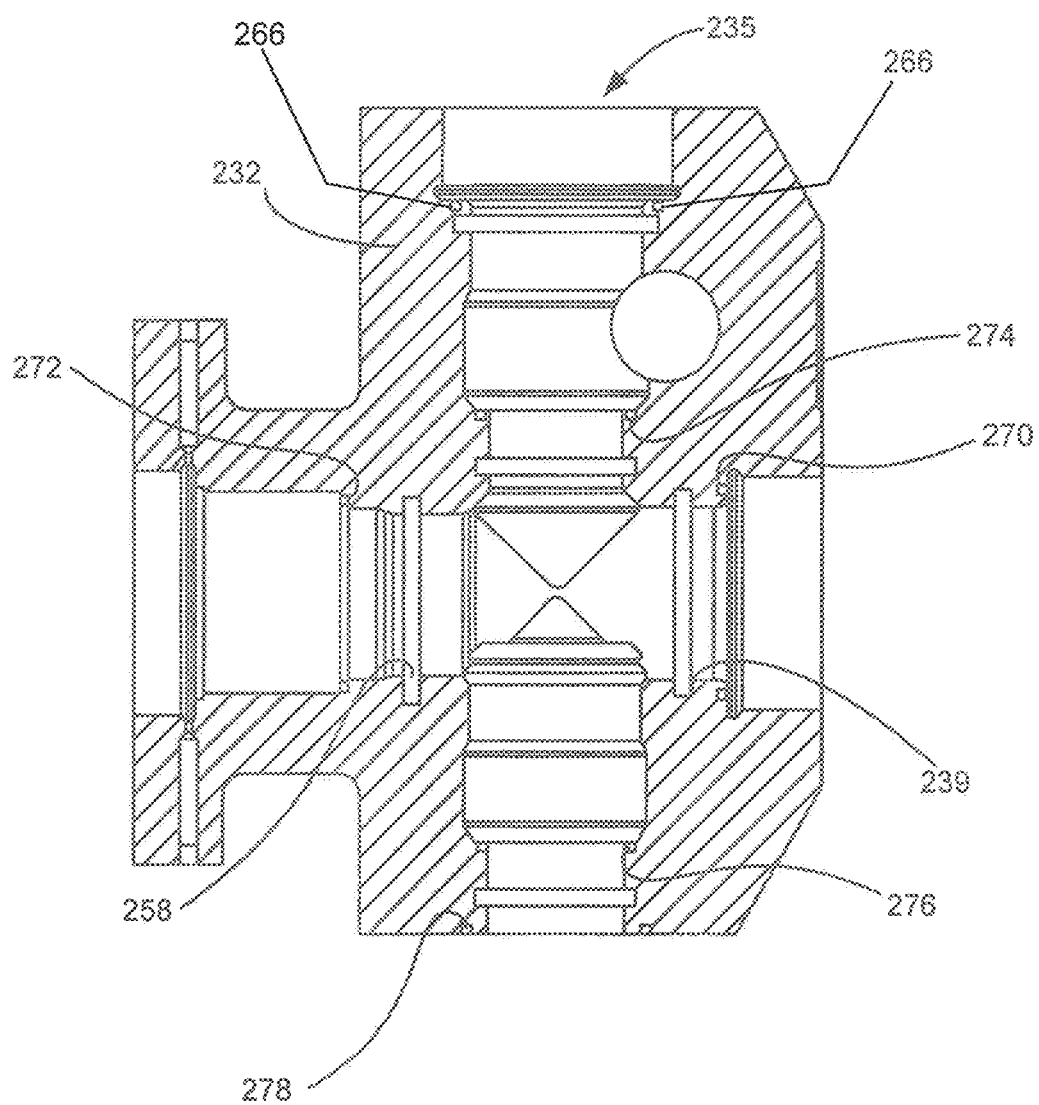
FIG. 14 is a cross-sectional depiction of another fluid end that is constructed in accordance with embodiments of this technology.
Figure 15:
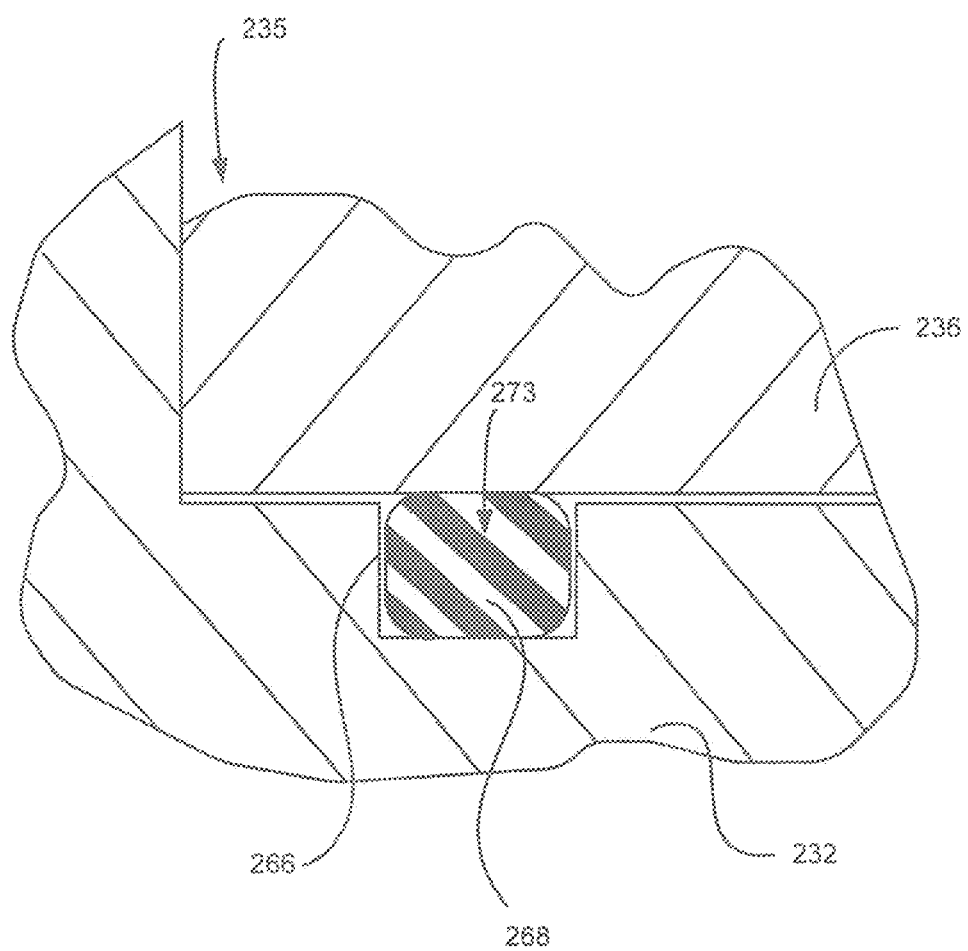
FIGS. 15 and 16 are enlarged depictions of portions of the fluid end of FIG. 14.

FIG. 14 depicts a number of additional endless grooves or recesses in the body 232 for mounting various seals to transfer the wear away from the body 232 to the mating component in accordance with embodiments of this technology. For example, the body 232 has a surface 266 defining a recess 273 intersecting the body bore that defines the discharge opening 235. Consistent with this whole description, this permits mounting an axial seal 268 (not depicted in FIG. 14, see FIG. 15) in the recess 273, the seal 268 configured to extend from the recess 273 to seal against a leading face of the discharge plug 236 (FIG. 11). FIG. 15 is a simplified enlarged depiction of the body 232 having a surface 266 defining the recess 273 into which an axial seal 268 is mounted. In these illustrative embodiments the seal 268 is configured to extend beyond the body bore defining the discharge opening 235 to seal against the discharge plug 236 as it is urged downward by advancing the retaining nut 238 (FIG. 11).

Importantly, the simplified seal construction depicted in FIG. 15 and elsewhere is in no way limiting of the contemplated embodiments and scope of the claimed technology. In alternative embodiments a radial seal or a crush seal and the like can be employed to transfer the erosion wear from the body 232 to the mating component. A crush seal refers to a seal construction that acts at least to some degree both axially and radially. For example, surface 272, shown in FIG. 14, forms a recessed corner having two walls that extend concentrically around the bore 252 (FIG. 11). The stuffing box sleeve 254 may be formed to have side walls that fully overlie the corner section formed by surface 272 when it is positioned in the bore 232. This allows the seal to act as a crush seal because it seals axially and radially against the sleeve 254.

Returning to FIG. 14, the body 232 can have other surfaces forming endless grooves or recesses for mounting various other seals. For example, surface 270 forms a recess for mounting a seal that is configured to seal against a sealing surface of a suction plug (not depicted), like in FIG. 15. In the same way the body 232 can have surfaces 272, 274, 276 forming recesses for mounting seals that are configured to seal against sealing surfaces of the stuffing box sleeve 254 (FIG. 11), the discharge valve seat (not depicted), and the suction valve seat (not depicted), respectively. Likewise, the body 232 can have a surface 278 forming a recess for mounting a seal that is configured to seal against a suction manifold (not depicted). What's common in any event is the seal construction of this technology transfers the seal wear from the body 232 to the less complex and less expensive mating component that is attached to the body 232.

Figure 16:
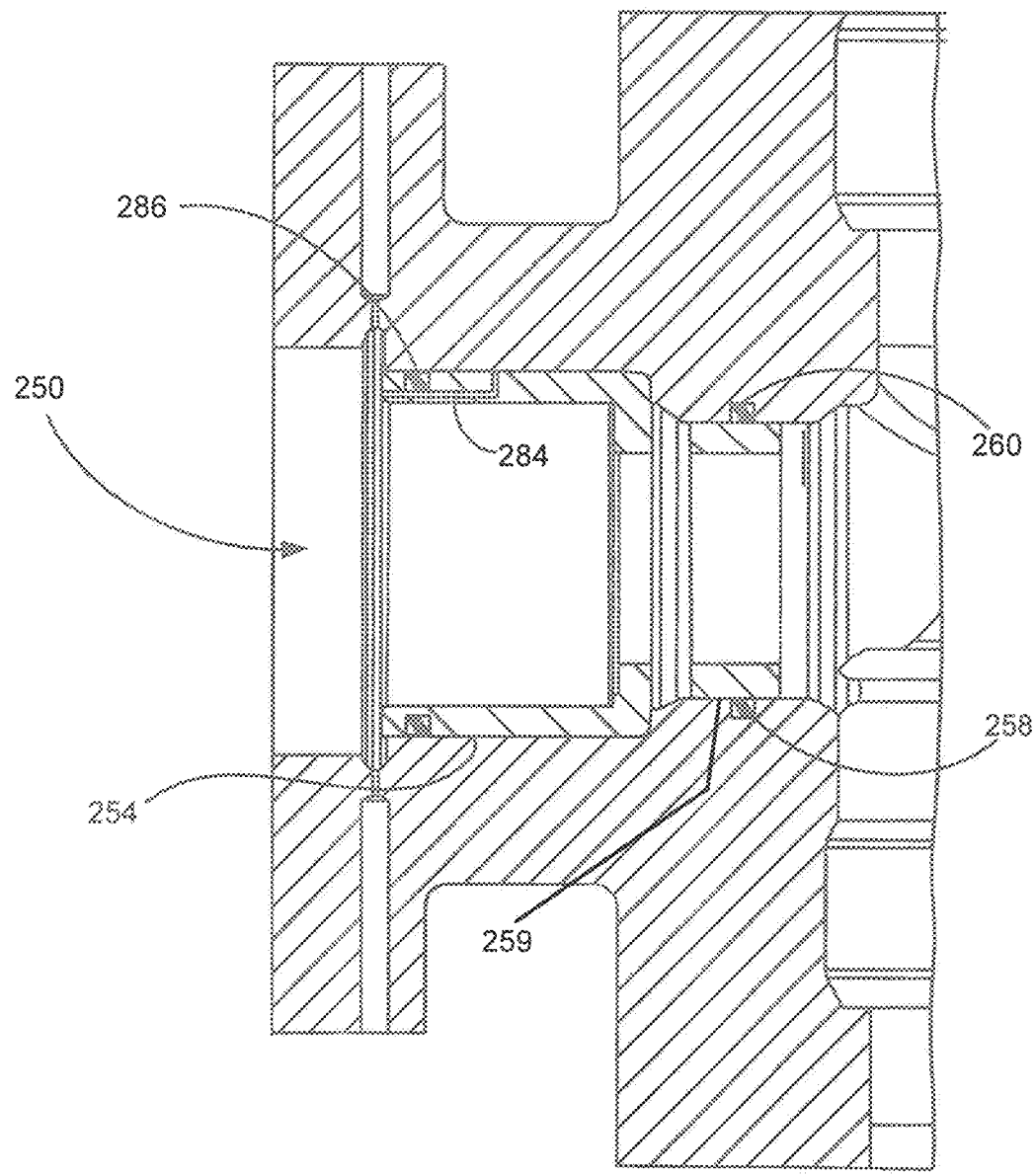

FIG. 16 depicts the stuffing box sleeve 254 (FIG. 11) inserted into the plunger opening 250 so that a seal 260 mounted in the recess 258 formed by the surface 257 extends from that recess 258 and seals against the sealing surface 259 defined by the stuffing box sleeve 254. As the stuffing box sleeve 254 is inserted into this position air pressure forms in a space defined in the clearance gap between the outer diameter of the stuffing box sleeve 254 and the body bore defining the plunger opening 250 and between the seal 260 and a seal 286 at an opposing end of the stuffing box sleeve 254. The air pressure exerts a force urging the stuffing box sleeve 254 out of the plunger opening 250, complicating manufacture and degrading the seal integrity at the lower end of the stuffing box sleeve 254. A breather opening 284 can be formed between that space and ambient space above the stuffing box sleeve 254 to vent the air pressure.

FIG. 16 also depicts a conventional construction of the seal 286 that is mounted in a recess formed by the stuffing box sleeve 254 and extends from that recess to seal against the body bore defining the plunger opening 250. The contemplated embodiments can include combinations of the conventional construction and the construction of this technology where other matters come into play. For example, without limitation, it can be feasible to use a stuffing box sleeve 254 depicted in FIG. 16 if it can be manufactured or otherwise acquired less expensively than providing the recess instead in the body 232, and if the particular seal location is one that is not necessarily critical in its role for the overall design for maintaining the highly-pressurized fluid in the flow passage.

FIG. 16 also depicts employing the open-cylinder-shaped stuffing box sleeve 254 and securing it in place by advancing the retaining nut 256 (FIG. 11). That construction is illustrative and in no way limiting of the contemplated technology. Other configurations can be employed as well. For example, the skilled artisan understands that a conventional stuffing box can be employed that combines the stuffing box sleeve 254 and the retaining nut 256, unitarily, into one component that has a recess for supporting a seal configured to seal against the body bore defining the plunger opening 235. In other conventional constructions a stuffing box without that recess is used in combination with a seal carrier insert that mates with the stuffing box and provides the recess for mounting the seal. In yet other contemplated embodiments the stuffing box sleeve 254 can be modified to a construction combining a substantially cylindrical-shaped stuffing box to which is mated a seal surface insert that provides the sealing surface 259 (FIG. 11).

Returning momentarily to FIG. 11, the sleeve 254 also protects the bore 252 from erosion by providing an inner diameter surface 264 against which the stuffing box packing (not depicted) seals. That, again, by design transfers the wear from the body 232 to the less complex and less expensive sleeve 254.

Summarizing, this technology contemplates a high pressure fluid flow apparatus constructed of a body defining a flow passage, a closure mounted to the body, and a means for sealing between the body and the closure. For purposes of this description and meaning of the claims the term "closure" means a component that is attached or otherwise joined to the body to provide a high-pressure fluid seal between the body and the closure. In some embodiments such as the described valve embodiments "closure" encompasses a moving component that is selectively positionable to control the fluid flow through the valve, such as the plug described and other components such as but not limited to a wedge, a clapper, a ball, a segment, and the like. In some embodiments such as the described fluid end embodiments "closure" encompasses nonmoving components joined to the body to seal an opening such as but not limited to the discharge plug, suction plug, discharge valve seat, suction valve seat, stuffing box sleeve, discharge flange, suction manifold, and the like. The term "means for sealing" means the described structures and structural equivalents thereof that mount a seal to a body instead of a mating closure to transfer the wear in comparison to previously attempted solutions from the body to the closure. "Means for sealing" expressly does not encompass previously attempted solutions that mount a seal to the closure to extend therefrom and seal against the body.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A method for manufacturing a fluid end assembly comprising:
   providing a housing having an external surface, an internal chamber, a first conduit formed in the housing having first and second sections, and a second conduit formed in the housing, intersecting the first conduit and having third and fourth sections, each section independently interconnecting the internal chamber and the external surface;
   forming an endless groove in the housing such that the groove surrounds the first section;
   positioning a seal within the groove;
   installing a discharge plug within the first section such that at least a portion of the discharge plug engages with the seal so as to form a barrier to fluid flow, in which the discharge plug has a top surface and an opposed bottom surface; and
   positioning a retainer attached to the housing and above the discharge plug such that the retainer is engaged with the top surface of the discharge plug and secures the discharge plug in a stationary position within the first section.

2. The method of claim 1 further comprising installing a suction plug into the fourth section.

3. The method of claim 1 further comprising installing a tubular sleeve into the third section.

4. The method of claim 1 further comprising forming the groove such that the groove has a pair of parallel side walls joined by a base.

5. The method of claim 4 further comprising forming the groove such that the groove opens in a direction parallel to a centerline of the first section.

6. The method of claim 4 further comprising forming the groove such that the groove opens towards a centerline of the first section.

7. The method of claim 1 in which the housing is configured to contain a fluid having a pressure of at least 8,000 pounds per square inch within at least a portion of the internal chamber.

8. A fluid end assembly, comprising:
a housing having an external surface and an internal chamber;
a first conduit formed in the housing and having first and second sections, each section independently interconnecting the internal chamber and the external surface;
a second conduit formed in the housing, intersecting the first conduit and having third and fourth sections, each section independently interconnecting the internal chamber and the external surface;
an endless groove formed in the housing such that the groove surrounds the first section;
a seal positioned within the groove;
a discharge plug installed within the first section such that at least a portion of the discharge plug engages with the seal so as to form a barrier to fluid flow, in which the discharge plug has a top surface and an opposed bottom surface; and
a retainer attached to the housing and engaged with the top surface of the discharge plug and configured to secure the discharge plug in a stationary position within the first section.

9. The fluid end assembly of claim 8 in which the first conduit is orthogonal to the second conduit.

10. The fluid end assembly of claim 8 in which the first and second sections are aligned and situated on opposite sides of the internal chamber.

11. The fluid end assembly of claim 10 in which the third and fourth sections are aligned and situated on opposite sides of the internal chamber.

12. The fluid end assembly of claim 8 in which the seal is not closely received within any groove formed in the discharge plug.

13. The fluid end assembly of claim 8 in which the groove is characterized by a pair of parallel side walls joined by a base.

14. The fluid end assembly of claim 13 in which the groove opens towards a centerline of the first section.

15. The fluid end assembly of claim 13 in which the groove opens in a direction parallel to a centerline of the first section.

16. A system comprising:
the fluid end assembly of claim 8; and
a fluid having a pressure of at least 8,000 pounds per square inch within at least a portion of the internal chamber.

17. The fluid end assembly of claim 8, in which the endless groove is characterized as the first groove and the seal is characterized as the first seal, and further comprising:
an endless second groove formed in the housing such that the second groove surrounds the fourth section;
a second seal positioned within the second groove; and
a suction plug installed within the fourth section such that at least a portion of the suction plug engages with the second seal.

18. The fluid end assembly of claim 17 in which the suction plug is sized to fully block fluid flow within the fourth section.

19. The fluid end assembly of claim 8 in which the retainer is directly engaged with the top surface of the discharge plug.

20. An apparatus, comprising:
a housing having an external surface and an internal chamber;
a first conduit formed in the housing and having first and second sections, each section independently interconnecting the internal chamber and the external surface;
a second conduit formed in the housing, intersecting the first conduit and having third and fourth sections, each section independently interconnecting the internal chamber and the external surface;
an endless groove formed in the housing such that the groove surrounds the fourth section;
a seal positioned within the groove;
a suction plug installed within the fourth section such that at least a portion of the suction plug engages with the seal so as to form a barrier to fluid flow; in which the suction plug has a top surface and an opposed bottom surface; and
a retainer attached to the housing and engaged with the top surface of the suction plug and configured to secure the suction plug in a stationary position within the fourth section.

21. The fluid end assembly of claim 20, which the endless groove is characterized as the first groove and the seal is characterized as the first seal, and further comprising:
an endless second groove formed in the housing such that the second groove surrounds the first section;
a second seal positioned within the second groove; and
a discharge plug installed within the first section such that at least a portion of the discharge plug engages with the second seal.

22. The fluid end assembly of claim 21 in which the discharge plug is sized to fully block fluid flow within the first section.

23. The fluid end assembly of claim 20 in which the first and second sections are aligned and situated on opposite sides of the internal chamber.

24. The fluid end assembly of claim 23 in which the third and fourth sections are aligned and situated on opposite sides of the internal chamber.

25. The fluid end assembly of claim 20 in which the retainer is directly engaged with the top surface of the suction plug.

* * * * *